Feb. 21, 1928. 1,660,239
R. STANFORTH
METHOD OF CLASSIFYING IRREGULARLY SHAPED MATERIAL EMPLOYED IN THE
MAKING OF BUTTONS OR BLANKS FOR DISKS OR THE LIKE
Filed April 9, 1923

INVENTOR.
Richard Stanforth.
BY Davis
his ATTORNEYS.

Patented Feb. 21, 1928.

1,660,239

UNITED STATES PATENT OFFICE.

RICHARD STANFORTH, OF ROCHESTER, NEW YORK, ASSIGNOR TO ART IN BUTTONS, INC., OF ROCHESTER, NEW YORK, A CORPORATION OF NEW YORK.

METHOD OF CLASSIFYING IRREGULARLY-SHAPED MATERIAL EMPLOYED IN THE MAKING OF BUTTONS OR BLANKS FOR DISKS OR THE LIKE.

Application filed April 9, 1923. Serial No. 631,044.

The present invention relates to a method of classifying irregularly shaped material employed in the making of buttons, or blanks for disks, buttons, or the like, and an object of the invention is to provide an improved method by which it is possible to determine the maximum desirable possibilities in buttons, or other articles contained in the material. Another object of the invention is to establish a plurality of groups of classes of articles of different sizes or shapes to be produced from the material, the classes of each group being graduated in diameter and differing from the classes of other groups in relative thickness or shape, to select the group of classes best suited to meet trade or manufacturing conditions, and to test each piece of material for diameter and thickness to determine the largest size of article obtainable therefrom corresponding to one of the classes of the selected group. Still another object of the invention is to provide a method in which the material is subjected to circumferential tests about the same axis, in planes predetermined with reference to a selected side of the material, for the maximum desirable size of articles obtainable therefrom. A further object of the invention is to classify material by subjecting each piece to two co-related simultaneous tests for diameter and thickness in predetermined planes preferably with reference to a selected side of the material. A further object of the invention is to classify material by subjecting each piece to two independently acting but co-related tests about a common axis. Another and further object of the invention is to classify material by means of a circumferential test, about a suitable axis of the piece in a direction at an angle other than a right angle to such axis, so that through one test may be defined the desirable maximum diameter and thickness of an article obtainable from the material.

To these and other ends, the invention consists of certain steps and combinations of steps in a method of classifying irregularly shaped material employed in the making of buttons, or blanks for disks, buttons, or the like, all of which will be hereinafter described and the novel features pointed out in the appended claims.

Figure 10:
Figure 11:
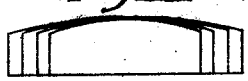
Figure 12:
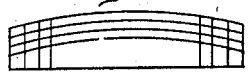

Figs. 10, 11 and 12 illustrate diagrammatically three different groups of classifications which may be followed in classifying blanks according to this invention, the outside geometrical figure of each of such figures of the drawings, representing the blank which is cut from the largest class in the group and the geometrical figures within representing other blanks of smaller sizes cut from other classes in the group, the blanks being cut with reference to a selected face of the material which is the line common to one side of all the geometrical figures.

Figure 6:
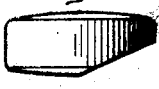
Figure 7:
Figure 8:
Figure 13:
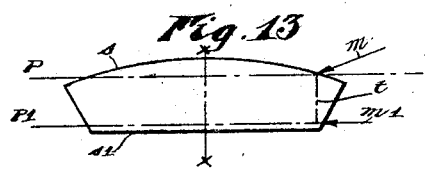
Figure 14:
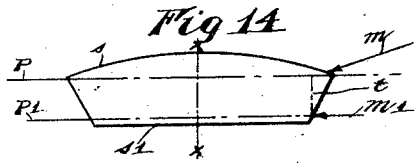
Figure 15:
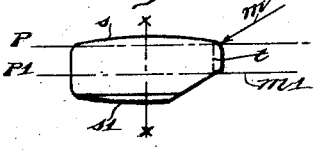
Figure 16:
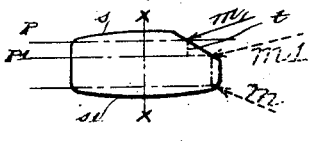
Figure 17:
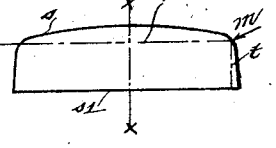
Figure 18:
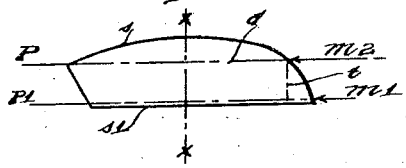
Figure 19:
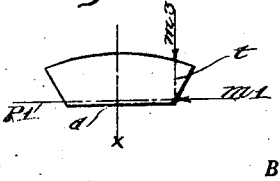

Figs. 13 and 14 show the manner in which irregularly shaped material is tested to define the desirable maximum size of the articles contained therein, in accordance with the graduated class group illustrated in Fig. 10;

Fig. 15 illustrates the application of this same class group and method of testing to one portion of a converted plural-article piece, such as illustrated in Fig. 6;

Fig. 16 illustrates a method of testing another portion of the converted plural-article piece, illustrated in Fig. 6;

Fig. 17 illustrates the manner in which the desirable maximum size of an article contained in an irregularly shaped piece may be defined through a single angular test;

Fig. 18 illustrates the manner in which an irregularly shaped piece of material is tested to determine the maximum diameter of an article contained therein at a predetermined thickness in accordance with the graduated class group illustrated in Fig. 11; and Fig. 19 illustrates the manner in which an irregularly shaped piece of material is tested to determine the maximum diameter and the maximum thickness of an article contained therein in accordance with the graduated class group illustrated in Fig. 12.

Figure 1:
Figs. 1, 2 and 3 are side views of typical irregularly shaped nut pieces.
Figure 2:
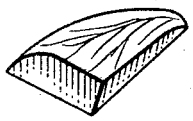
Figure 3:
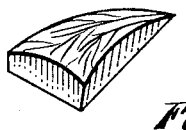
Figure 5:
Figs. 5, 6, 7 and 8 are side views of four converted pieces from which buttons, or other articles, are formed.
Figure 4:
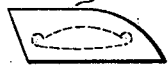
Fig. 4 is a side view of an irregularly shaped nut piece and shows, within the dotted lines, the material, which according to a known or common method is utilized for producing buttons or blanks.
Figure 9:
Fig. 9 illustrates an irregularly shaped piece of material, and shows in dotted lines the manner in which the same may be utilized for obtaining a blank of the maximum diameter, or a blank of the maximum thickness.

Buttons, or blanks for disks, buttons, or the like, are usually produced from irregularly shaped material, such as bone, shell, or the so-called "ivory" nut pieces, typical shapes of which are illustrated in Figs. 1 to 3 of the drawings. In some cases the buttons, or other articles, are formed directly from the irregularly shaped material, as illustrated in Fig. 4, while in other cases the practice is followed of first converting the material into circular disks, or blanks, such as illustrated in Figs. 5 to 8, inclusive, and then forming the buttons or other articles from these converted pieces. A problem in either case, due to the variation in shape of the material and the inaccuracy of the classifying means heretofore available, has been to secure from the material, irrespective of its shape, the desirable maximum yield in buttons, or blanks for disks, buttons, or the like. This desirable maximum yield is not necessarily the button or other article of the greatest diameter obtainable from the material, as illustrated in dotted lines in Fig. 9 at $a$, nor is it necessarily the greatest number of articles, or an article of the greatest thickness, as illustrated in dotted lines in the same figure at $b$, but consists in the largest size, or number of articles which will meet varying trade or market requirements and may at different times be either of the extremes mentioned, or any demand in between these extremes.

According to this invention, there is preferably established one or more groups of classes of articles of different sizes or shapes to be produced from the material, and each piece of irregularly shaped material, whether nut pieces, such as illustrated in Figs. 1 to 3 of the drawings, or converted pieces, such as illustrated in Figs. 5 to 8, inclusive, is subjected to one or more testing operations which correspond with one of the established groups just referred to and define the class of the selected group to which the piece belongs. These testing operations are varied in some particulars to suit the different class groups as will be explained hereinafter, but, in all cases, the tests are made to determine the desirable maximum yield in buttons, or other articles obtainable from the material.

Some of the types of graduated article class groups which may be employed in this method are illustrated diagrammatically in Figs. 10 to 12, inclusive, the type of group selected in any given case depending upon the result it is desired to obtain. In each of these Figs. 10 to 12, inclusive, the outer geometrical figure represents a blank obtainable from the class of largest pieces in the group, while the geometrical figures within this outer or largest geometrical figure represent blanks obtainable from small classes in the group. It will be noted that each of these geometrical figures, in this instance, has a common side which represents the plane of the selective face of the material and from which the blanks are formed and from which also the pieces are tested. The type of group illustrated in Fig. 10, for example, is followed when it is desired to have a number of classes which are graduated in both thickness and diameter with reference to a selected side of the material. The type of group illustrated in Fig. 11 has its classes graduated only in diameter and is followed when it is desired to define in the material articles of the maximum diameter at a predetermined thickness. In Fig. 12 is shown a group which may be followed when it is desired to define in the material articles of the maximum diameter and the maximum thickness for such maximum diameter. Any number of similar groups of classes may be made with reference to the relative diameter or thickness or shape of the articles to be produced.

In all of the testing operations, each piece of material is tested for one or more dimensions, as, for instance, diameter, or thickness or both, about its entire circumference preferably in predetermined planes which are fixed with reference to a selected side of the material and are held constant for each of the graduated article class groups. For example, in Fig. 13 is illustrated a method of testing employed when using the type of class group shown in Fig. 10. In this case, the piece of material is subjected to two conjoint circumferential tests indicated at $m$ and $m^1$, about the same axis $x$, the test at $m^1$ being made in the plane $p^1$ at a fixed distance from a selected side of the material, in this instance $s^1$, while the test indicated at $m$ is made on a line which is at an angle other than a right angle to the axis $x$. One of these two tests, $m$ in the case illustrated, defines in each piece of material the maximum diameter of a button or other article obtainable therefrom which has a thickness equal to the distance $t$ between the two tests. The diameter class of the material for a given class group is not, however, always defined by the same test for, while, in Fig. 13, the diameter is defined by the test indicated at $m$, the diameter of another piece of material, owing to its shape, may be defined by the test indicated at $m^1$, as illustrated in Fig. 14.

While the method of testing just described is illustrated in connection with irregularly shaped nut pieces, it is equally applicable to irregularly shaped material of other forms, such, for example, as the converted plural-article pieces shown in Figs. 5 to 8, inclusive. As an illustration of the application of the described method to one of these converted pieces, reference may be had to Fig. 15. In this illustrated application, two conjoint circumferential tests are first made for the button or other article adjacent one side of the piece, as, for instance, the side $s$, at a fixed and constant distance from the opposite or selected side $s^1$, the test indicated at $m^1$, in this instance, defining the diameter class of the piece at a thickness defined by the distance between the two tests. The remaining articles in the converted piece may be defined by making one test only for each article, as illustrated in Fig. 16. In this instance, the relative position of the converted piece is reversed and subjected to a test indicated at $m$ and made on a line which is at an angle other than a right angle to the axis $x$. This test $m$, being made in a fixed relation to the plane $p$, in which the test $m^1$ was made in the first instance, defines both diameter and thickness in one operation. Should the converted piece have a thickness sufficient to yield more than two buttons or similar articles, the single angular test just described may be repeated in different planes for each of the articles contained.

This single measurement may also be used in connection with other forms of irregularly shaped pieces as, for instance, the nut piece illustrated in Fig. 17, by causing the test indicated at $m$ to be made on the skin or curved side of the irregularly shaped piece, so that there is defined simultaneously a diameter $d$ and a thickness $t$ for such diameter, both being determined with reference to the selected side $s^1$ of the material which is, in this case flat. It is apparent that the relation between the diameter and thickness of the article defined by this testing operation varies with the angle of action of the test $m$.

In some instances, it is desirable to define, in a predetermined plane of the material, an article having the maximum diameter for a predetermined thickness. This result may be obtained by following the class group illustrated in Fig. 11 and subjecting the material to two conjoint circumferential tests, indicated at $m$ and $m^1$ in Fig. 18, about a common axis $x$, and at a fixed distance from each other, both tests acting at right angles to the same axis $x$.

In other instances, it is desirable to define in the material the maximum diameter of an article obtained therefrom in a predetermined plane having a maximum thickness for such maximum diameter. In this case, the class group illustrated in Fig. 12 may be followed, and the material subjected to the two tests indicated at $m^1$ and $m^3$ in Fig. 19, the test $m^1$ acting in a plane predetermined with reference to a selected side $s^1$ of the material and testing for the maximum diameter of an article obtainable therefrom, while the test $m^3$, acting on the perimeter of such diameter, defines the maximum thickness for such diameter.

The invention is not limited to the specific tests herein described for, as has been pointed out and illustrated, the tests vary with the different class groups which, being designed to meet varying trade or market conditions, are not limited in number. All of the tests, however, are alike in one or both of two characteristics, i. e., they may be made in planes which are predetermined and fixed with respect to a selected side of the material for each group, or they may be made on lines which are at angles other than right angles to a suitable axis of the material about which the tests are made.

The means or mechanism employed for carrying out this method should effect a rotation of either the material or the testing device, so that the testing device will cooperate with the material about its entire circumference. Provision also should be made whereby the testing device or the material may, during the testing operation, move transversely of the axis of rotation, so that the point on the circumference of the material nearest the axis in the direction of the test may be found.

A further desirable provision of the testing operation is that it shall be made along a line which shall bear a certain relation to a selected class group, the arrows in the drawing indicating certain desirable lines on which the tests can be made. When a class group is used which has a number of classes decreasing relatively both in thickness and diameter, a desirable line of tests will lie at an angle other than a right angle to the axis about which the test is made. Whereas, when a class group is selected in which the classes decrease in diameter only, the line or lines of test are preferably made at right angles to such axis. In some cases, as for instance, when it is desired to define in the material the maximum diameter and the maximum thickness for such maximum diameter, one of the desirable lines of test is parallel with the axis of the diameter test, the position of such line of tests being movable toward and from said axis.

The classifying tests may be made in one operation, as when either the material or the testing device is turned, so that the circumference of the material is tested at all points, the testing device or the material, at the same time, moving transversely of the axis of rotation; or the tests may be by a succession of operations, as when the material is free to be turned and, at the same time, to move transversely of its axis so as to present all portions of its periphery to a number of rigid testing devices.

When movable testing devices are employed, they should move back and forth on the lines in which the tests are made, such, for instance, as indicated by the arrows in Figs. 13 to 19, whereas when rigid testing devices are employed, they should be positioned progressively along such lines to correspond with the selected class group. When two tests are made by movable testing devices, these devices preferably act independently, but are so co-related that the result of the combined tests defines the class of the selected group.

It will be noted that applicant's test for thickness is made toward or in proximity to the edge of the proposed button or blank and therefore the measurement for thickness is in effect a measurement to provide for proper or requisite edge thickness in the proposed blank or button.

From the foregoing it will be seen that there has been provided a method which has a number of advantages. First, it is possible to accurately classify material irrespective of its shape. Second, there is provided a flexible method through which any suitable material may be classified according to the maximum desirable yield in buttons, or other articles obtainable therefrom, to meet any trade or manufacturing conditions. Third, the classification of the material may take place with respect to a selected side thereof, so that the article to be produced may be obtained from the most desirable portion of the material. Fourth, the classification with respect to one side of the material permits the use of this side later as a guide for locating the defined or determined object for the cutting operation. Fifth, in some shapes of material, it is possible through a single measurement at right angles to the axis about which a test is made to define or determine both the thickness and diameter of the material.

What I claim as my invention and desire to secure by Letters Patent is:

1. A method of classifying irregularly shaped material employed in the making of buttons, or blanks for disks, buttons, or the like, which consists in establishing a plurality of classes of articles of different sizes or shapes to be produced from the material, each class having a decrease in thickness with a decrease in diameter, making two corelated tests of the material about a common axis for diameter and thickness to determine the largest size of article obtainable from the material corresponding to one of the established classes, and placing the material in the class determined by the two co-related tests.

2. In a method of classifying irregularly shaped material employed in the making of buttons, or blanks for disks, buttons, or the like, the step which consists in subjecting the material to two co-related simultaneous tests for thickness and diameter about a common axis and in a predetermined plane with respect to a selected side of the material.

3. In a method of classifying irregularly shaped material employed in the making of buttons, or blanks for disks, buttons, or the like, the step which consists in subjecting the material to two independently acting but co-related dimension tests about a common axis.

4. In a method of classifying irregularly shaped material employed in the making of buttons, or blanks for disks, buttons, or the like, the step which consists in testing the material circumferentially about a suitable axis and on a line other than a right angle to said axis for one dimension of the material.

5. In a method of classifying irregularly shaped material employed in the making of buttons, or blanks for disks, buttons, or the like, the step which consists in testing the material circumferentially about a suitable axis and on a line other than a right angle to said axis for another dimension of the material, and, at the same time, subjecting the material to a co-related circumferential test about the same axis and on a line at right angles to such axis.

6. In a method of classifying irregularly shaped material employed in the making of buttons, or blanks for disks, buttons, or the like, the step which consists in subjecting each piece of material to two independently acting but co-related dimension tests about a common axis in a predetermined plane with respect to a selected side of the material.

7. In a method of classifying irregularly shaped material employed in the making of buttons, or blanks for disks, buttons, or the like, the step which consists in subjecting each piece of material to two independently acting but co-related dimension tests about a common axis in predetermined planes with respect to a selected side of the material, one of said tests being on a line at an angle other than a right angle to said axis and the other of said tests being on a line at right angles to said axis.

8. In a method of classifying irregularly shaped material employed in the making of buttons, or blanks for disks, buttons, or the like, the step which consists in subjecting the material to a point test for diameter by engaging the material at successive points completely about the material in a selected predetermined plane at right angles to a suitable axis.

9. In a method of classifying irregularly shaped material employed in the making of buttons, or blanks for disks, buttons, or the like, the step which consists in subjecting the material to a point test for diameter by engaging the material at successive points completely about the material in a selected pre-determined plane at right angles to a suitable axis and simultaneously making another point test about the same axis as to thickness.

10. A method of classifying irregularly shaped material employed in the making of buttons, blanks, or disks for buttons, or the like, which consists in establishing a plurality of classes of articles of different sizes and shapes to be produced from the material, each class having a decrease in thickness with a decrease in diameter, making two co-related tests of each piece of material for diameter and edge thickness of a proposed blank or button to determine the largest size obtainable from the material, corresponding to one of the established classes, and placing the material in the class determined by the two tests.

RICHARD STANFORTH.